United States Patent [19]

Canfield et al.

[11] Patent Number: 4,965,669

[45] Date of Patent: Oct. 23, 1990

[54] APPARATUS FOR DIGITALLY CONTROLLING THE D.C. VALUE OF A PROCESSED SIGNAL

[75] Inventors: Barth A. Canfield, Indianapolis, Ind.; Russell T. Fling, Naperville, Ill.

[73] Assignee: RCA Licensing Corporation, Princeton, N.J.

[21] Appl. No.: 335,195

[22] Filed: Apr. 12, 1989

[51] Int. Cl.$^5$ .............................................. H04N 5/18
[52] U.S. Cl. .................................... 358/171; 358/168; 358/183
[58] Field of Search ................ 358/168, 171, 173, 181, 358/183, 172

[56] References Cited

U.S. PATENT DOCUMENTS

| | | | |
|---|---|---|---|
| 3,985,954 | 10/1976 | Kuniyoshi et al. | 178/7.3 |
| 4,296,437 | 10/1981 | Geurts | 358/173 |
| 4,415,929 | 11/1983 | Yoshisato | 358/171 |
| 4,470,066 | 9/1984 | Wölber et al. | 358/171 |
| 4,544,951 | 10/1985 | Yoshisato | 358/172 |
| 4,660,084 | 4/1987 | Filliman et al. | 358/171 |
| 4,660,085 | 4/1987 | Harwood et al. | 358/171 |
| 4,663,668 | 5/1987 | Rabii et al. | 358/168 X |
| 4,707,741 | 11/1987 | Stratton | 358/171 |
| 4,718,119 | 1/1988 | Salzer et al. | 455/619 |
| 4,722,006 | 1/1988 | Kimura et al. | 358/171 |
| 4,729,026 | 3/1988 | Suzuki et al. | 358/168 |
| 4,742,392 | 5/1988 | Hashimoto | 358/172 |
| 4,786,969 | 11/1988 | Shouji et al. | 358/171 |

*Primary Examiner*—Howard W. Britton
*Assistant Examiner*—Mark R. Powell
*Attorney, Agent, or Firm*—Joseph S. Tripoli; Eric P. Herrmann; James B. Hayes

[57] ABSTRACT

A digital D.C. control system includes a multiplexer, a digital-to-analog converter, a capacitor, offset generating circuitry and clamping circuitry. A digital signal to be D.C. controlled and a digital brightness control signal are alternatively coupled by the multiplexer to the input of the digital-to-analog converter. The output from the digital-to-analog converter is coupled to a system output terminal via the capacitor. When the signal is applied to the digital-to-analog converter a fixed D.C. offset is applied to the interconnection of the converter and capacitor. During preselected intervals the D.C. control value is coupled to the digital-to-analog converter concurrently with the system output terminal being clamped to a fixed reference and the D.C. offset circuitry being disabled. This combination of apparatus permits controlling the D.C. level of a digitally processed signal without affecting the dynamic range of the digital signal.

6 Claims, 2 Drawing Sheets

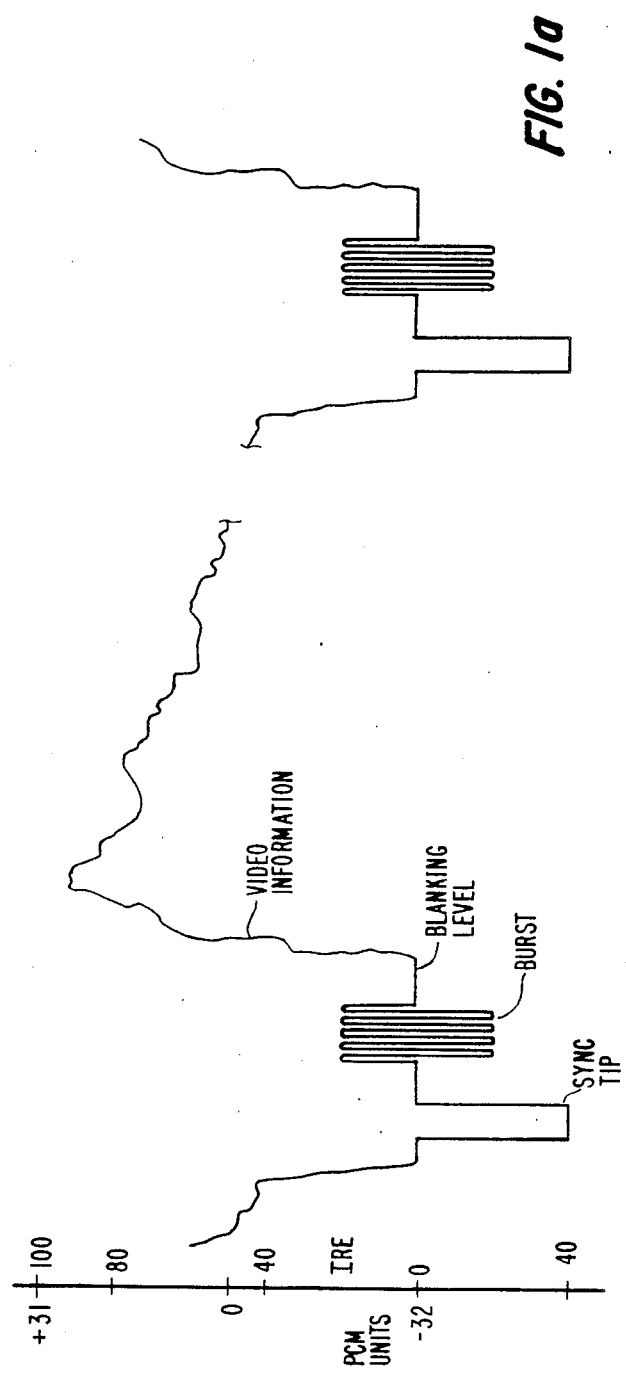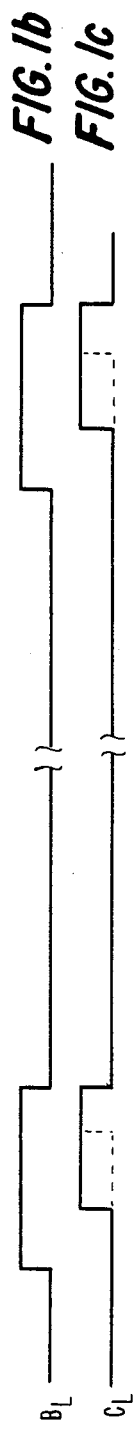

APPARATUS FOR DIGITALLY CONTROLLING THE D.C. VALUE OF A PROCESSED SIGNAL

This invention relates to signal processing circuitry and particularly systems which employ both digital and analog circuitry.

BACKGROUND OF THE INVENTION

In digital signal processing systems in which an analog signal is converted to pulse code modulated PCM (e.g., binary) form, processed in PCM format and then converted back to analog form, it is desirable to constrain the number of bits per sample to the smallest number consistent with the desired quantization resolution and dynamic range of the signal. In fact, however, the number of bits per sample may increase as the samples progress through the digital system and the required bit capacity of the digital-to-analog converter may exceed the sample bit width of the analog to digital converter. This is particularly true in processing video signals. Consider, for example, a digitaly processed luminance signal which represents a black and white video image. The average brightness of the image is dependent upon the D.C. or average amplitude of the luminance signal. If the dynamic range of the luminance signal is exactly equivalent to the maximum value which can be represented by the bit width of the processing system, brightness control cannot be digitally implemented without clipping the signal peaks, on the one hand, or expanding the system bit width on the other hand. In general both alternatives are undesirable since they either compromise performance or increase system cost.

Consider also a pix-in-pix video system wherein video images from separate sources are simultaneously displayed on exclusive portions of a single display screen. Generally, it is desirable that the average brightness of both images be approximately equal so that the viewer's attention is not significantly attracted to only one of the two images. In order to insure that the average brightness of the two images is approximately equal, typical pix-in-pix receivers will cause the two signals representing the two images to be clamped to like D.C. reference values.

It is an object of this invention to provide a digital D.C. level control in a digital and analog video processing system without expanding the system bit width or compromising the signal quality.

It is a further object of the invention to provide a clamp circuit for clamping the average D.C. value of two video signals to the same value.

SUMMARY OF THE INVENTION

The present invention includes a digital control system for adjusting the average value or D.C. value of a processed signal. This system incorporates a digital-to-analog converter having circuitry connected to its output terminal for selectively offsetting the D.C. level of the output signal from the converter. The output connection of the digital-to-analog converter is coupled to one electrode of a capacitor. The other electrode of the capacitor is coupled to an output terminal of the system and to a selectably operable reference potential. Digital signal to be converted and D.C. control values are selectively coupled to the digital-to-analog converter via a multiplexor. The selectably operable reference potential is coupled to the capacitor at predetermined intervals concurrently with the D.C. control values being coupled to the digital-to-analog converter and the output of the digital-to-analog converter is D.C. offset by the circuitry for selectively offsetting its output signal.

BRIEF DESCRIPTION OF THE DRAWINGS

FIG. 1 is a waveform diagram useful in describing the invention.

DETAILED DESCRIPTION

Figure 2:
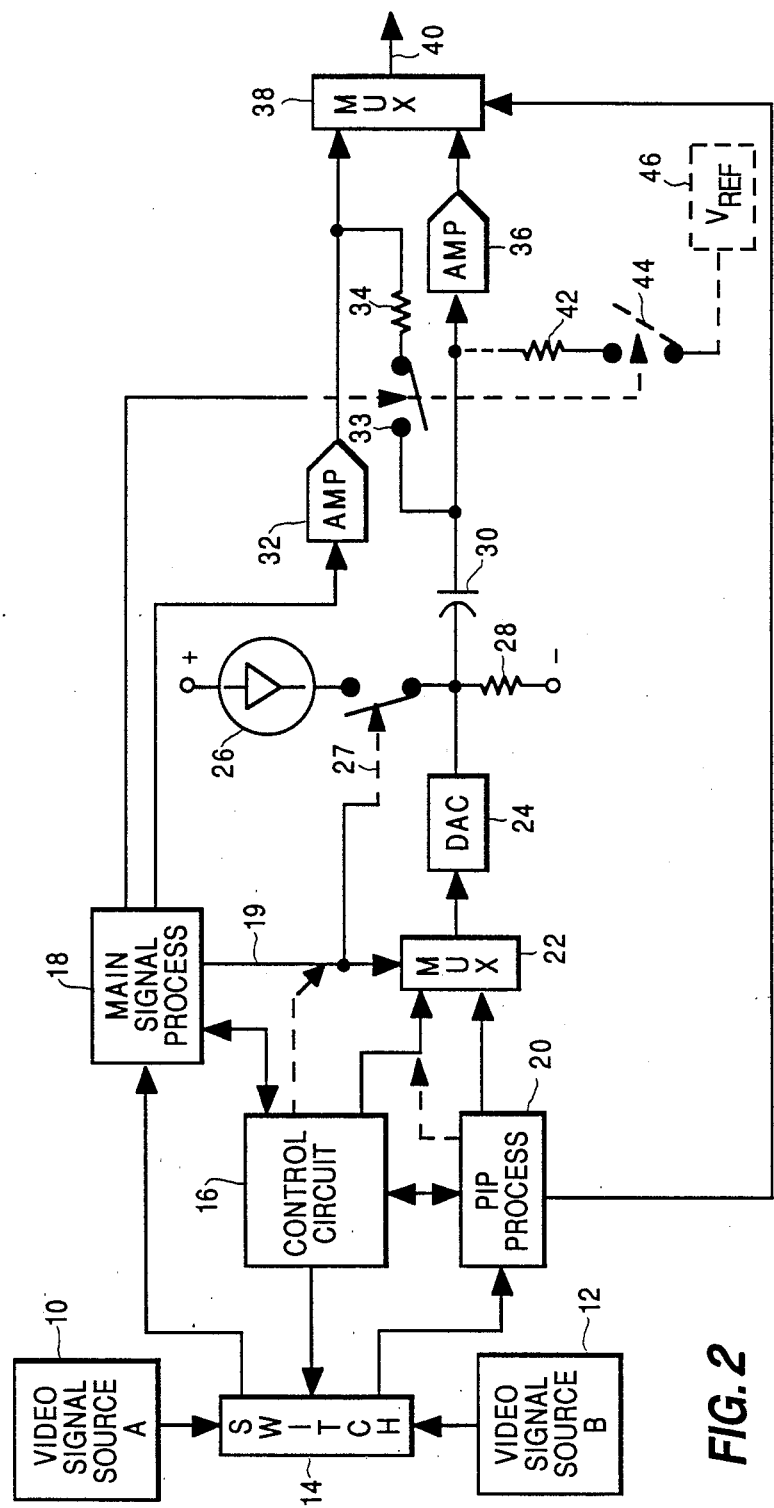
FIG. 2 illustrates a block diagram of analog and digital signal processing circuitry included in a pix-in-pix video signal processor incorporating an embodiment of the invention.

The invention will be described in the environment of a picture-in-picture video signal processing system though it is to be understood that it has significantly broader applications.

Referring to FIG. 1, approximately one horizontal line of a standard NTSC type baseband composite video signal is illustrated. The signal includes a horizontal synchronizing component, a reference frequency or burst component, a blanking level component and an information component. The amplitudes of the particular components are standardized and measured in IRE units with the tip of the horizontal synchronizing component being the most negative at minus 40 IRE units and the maximum value of the information component being the most positive at 100 IRE units. The blanking level is at zero IRE and is a few IRE backer than the normal black level displayed in an image. If the horizontal synchronizing pulse is stripped from the signal, the average brightness of the image represented by the video information is a linear function of the average or D.C. value of the video information over the line interval.

Refer now to FIG. 2 which illustrates in part the general processing apparatus of a pix-in-pix system. In FIG. 2, two video signals, A and B, from respective sources 10 and 12, which may be conventional tuner-If-detector circuits, are applied to a switch 14. Switch 14 is controlled by system control circuitry 16 responsive to user input, to route one or both of the input signals A and B to respective main video and pix-in-pix signal processing paths. The main video processing path includes circuitry 18 which may include circuitry for extracting synchronizing signals to generate deflection and blanking signals, and for conditioning the video information component for application to a display device, etc. Output signal from the processing circuitry 18 is coupled to a buffer amplifier 32. The output signal provided by buffer amplifier 32 is coupled to one input of a multiplexing circuit 38. Signal from the pix-in-pix processing path is coupled to a second input terminal of the multiplexing circuit 38. Multiplexing circuit 38 is conditioned by a control signal from the pix-in-pix processor to selectively time division multiplex the main video signal and the pix-in-pix signal (as is known in the video signal processing art) to generate a signal formatted to display the pix-in-pix image as an inset in the main image. The output, 40, of the multiplexing circuit 38 is coupled to further processing circuitry (not shown) for conditioning the signal for display.

Known pix-in-pix processors are of two general types, those which process composite video signals and those which process component video signals. In the former case the further processing circuitry will include apparatus to separate luminance and chromanance signals and for generating R, G, and B signals related to the primary colors. In this instance circuitry 18 will include minimal processing circuitry.

In component systems luminance and chrominance signals are processed separately. Component systems require somewhat duplicative circuitry of that illustrated in FIG. 2 to process both components. In this instance the circuitry 18 will include circuitry to separate the luminance and chrominance components and the further processing circuitry subsequent the multiplexer 40 will be simplified.

In the discussion to follow assume that the apparatus of FIG. 2 is processing either composite video signal or the luminance component of a video signal.

The pix-in-pix processing path includes processing circuitry 20 whose primary purpose is to synchronize the second video signal to the main video signal and to compress the second video signal. The processing circuitry 20 may include an analog-to-digital converter for converting the analog video signal to PCM signals. In addition it will include a field or frame memory for storing the PCM video signal and timing circuitry for synchronizing the writing of signal of memory and reading of signal from memory, etc. Synchronized PCM samples from the processing circuitry 20 are coupled to the digital-to-analog converter 24, wherein they are converted to analog form and thereafter coupled, via buffer amplifier 36 to the multiplexing circuit 38.

For the purpose of this disclosure the contents of circuitry 20 are not important. Suffice it to say that the bit width of the PCM samples comports with the bit width if the sample input port of the digital-to-analog converter (DAC). In this example it is assumed that processor 20 processed the video signal in 6 bit, two's complement, samples, and that the most negative binary sample provided by the processor 20 corresponds to the blanking level of the video signal. In terms of IRE units (FIG. 1) the 64 possible states of the six bit samples span the 100 IRE video information range. Positive 31 units corresponds to 100 IRE; negative 32 units corresponds to zero IRE or blanking level; and zero units corresponds to 50 IRE. Note, in general, whether the system is processing composite or component signals it is not necessary to store and/or output either the horizontal synchronizing or burst components of the secondary signal. The components may be used internal to circuitry 20 but are not required for further processing. Therefore, circuitry 20 can, without compromising signal integrity, arrange the 64 PCM states to correspond to the 0-100 IRE video information range.

Consider that the secondary video signal level is 100 IRE in the 6-bit system described and it is desired to (a) increase the average brightness level, (b) not increase the bit capacity of the DAC 24 or clip the video signal and (c) perform the function digitally. Obviously, if a constant binary value is added to the PCM video signal to raise the brightness level additional bits must be added to the samples to preclude clipping the occurrences of maximum signal values, and thus the bit capacity of the DAC 24 must be increased contrary to one of the above conditions.

Consider that the main and secondary video signals are sourced from different channels and may have blanking eves diverging from zero IRE due to adverse transmission conditions. This situation may tend to establish the average brightness of the two signals at significantly different levels even for like initial conditions. Significantly differing brightness levels between the main and inset image may create viewer annoyance. Therefore, it is desirable to incorporate apparatus to clamp the D.C. or average evens of the main and secondary video signals to the same value.

Both of the foregoing functions may be performed with the addition of a current source, a capacitor, two switches and a multipexer as follows. First, it is assumed that the DAC 2 provides an output current, which is converter to an output voltage by virtue of the resistor 28 connected between the output terminal of DAC 2 and supply potential. Also assume that DAC 2 provides zero current for a PCM input value of negative 32. Thirdly, assume that either the control circuit 16 or the processor 20 is arranged to provide brightness control values.

The brightness control values are coupled to one input port of a multipexer 22. PCM Video signal from the processor 20 is coupled to a second input port of multiplexer 22, the output port of which is coupled to DAC 24. The multiplexer 22 is conditioned by a signal, $B_L$, (connection 19) provided by the main signal processor, to couple the brightness control values to the DAC during the horizontal blanking intervals and to couple the video signal to the DAC during active video.

A constant current source 26 is coupled to the output port of the DAC 24 via a switch 27. The switch 27 is conditioned by the signal $B_L$ to close during active video.

The capacitor 30 coupes the output port of the DAC 24 to the buffer amplifier 36. A resistor 34 is coupled from the output of the buffer amplifier 32 (main video signal) to the interconnection of capacitor 30 and buffer amplifier 36 via a further switch 33. Switch 33 is conditioned by a clamp signal $C_L$, generated in processor 18, to close during the horizontal blanking interval when the blanking level is present and to open for the duration of the active video information.

Note that switch 33 may be closed during the burst component of a composite video signal since the average value of burst is equal to the blanking level. The value of resistor 34 must be high enough relative to the output impedance of buffer amplifier 32 so that the output potential of amplifier 32 is not affected. It need not be high enough to suppress completely, at capacitor 30, any A.C. ripple from the main video signal.

The clamp/brightness circuitry operates as follows. The current source 26 supplies a current equal to $1/N^{th}$ the range of currents provided by DAC 24. This current is applied during active video and is conducted by resistor 28 to develop an offset potential of $1/N^{th}$ the potential range developed by the output current provided by the DAC 24.

During the blanking interval switch 33 is closed and the blanking level of the main vide signal is impressed on the capacitor 30 establishing an equal valued blanking level on the secondary video signal. While switch 33 is closed, multiplexer 22 is conditioned to apply a brightness level control value to the input port of the DAC 24 and switch 27 is open circuited. Consider first that the brightness level control value is equal to $1/N^{th}$ the dynamic range of the DAC. The DAC 24 will develop an output current equal to $1/N^{th}$ its maximum output current and develops a potential across resistor 28 equal to $1/N^{th}$ the range of potentials that can be developed by the DAC current alone. At the end of the blanking interval switch 33 is open circuited disconnecting the main and secondary video signals with the main signal blanking level established on the output electrode of capacitor 30. In addition, switch 27 is closed and the multiplexer 22 is conditioned to couple the secondary video signal to the DAC 24. Assume that the secondary video signal has a value equal to the blanking level so that the DAC 24 provides zero output current. Current source 26 applies the $1/N^{th}$ valued current to resistor 28 so that after switchover no D.C. potential change occurs across the resistor 28. If no D.C. potential change occurs at the output connection of the DAC (input connection of capacitor 30) no D.C. change will occur at the output electrode of capacitor 30. The average brightness level of the secondary video signal will therefore be referenced to the blanking level of the main video signal which was applied to capacitor 30 via switch 33.

Now consider altering the brightness level of the secondary video. If a brightness control value which is greater (lesser) than 1/N times the dynamic range of the DAC is coupled to the DAC during the blanking interval, when the switch 27 is closed and the video signal is coupled to the DAC, a D.C. shift of $\Delta V$ will occur across the resistor 28. For example, assume a brightness control value of 2/N times the dynamic range of the DAC. During blanking (with switch 27 open and switch 33 closed) a potential of 2/N the dynamic range of the DAC is coupled to the input electrode of capacitor 30 and the main video blanking level is coupled to the output electrode. Then switch 33 is opened, secondary video signal is applied to the input of the DAC and switch 27 is closed coupling the 1/N current source to the capacitor 30. The D.C. level at the input side of capacitor 30 is reduced by $\Delta V = 2/N - 1N = 1/N$ times the dynamic range of the DAC. This potential change $\Delta V$ is coupled across capacitor 30 reducing the brightness level by $\Delta V$. Conversely, if during the blanking interval a brightness level of minus 32 (zero output current value) were applied to the DAC, a positive D.C. potential shift $\Delta V$ of 1/N times the dynamic range of the DAC will be coupled across capacitor 30. With the foregoing arrangement the brightness level of the secondary video signal can be adjusted upward by $1/N^{th}$ the dynamic range of the DAC and downward by (N-1)/N times the dynamic range of the DAC. This D.C. adjustment is accomplished without altering the dynamic range or the bit width of the DAC or the digital processing circuitry.

The foregoing example has been directed to circuitry for changing the D.C. or brightness level of a video signal in a pix-in-pix receiver. A more generalized arrangement applicable to digitally controlling the D.C. level of a video or other signal is indicated by elements 42, 44 and 46. In the general embodiment elements 42-46 are utilized in place of switch 33, resistor 34 and the main video signal. In this embodiment, during blanking or some other appropriate time interval switch 44 is closed, coupling a reference potential $V_{REF}$ provided by the potential source 46 to the output side of the capacitor 30. D.C. control of the output signal is made relative to the value $V_{REF}$.

The FIG. 2 arrangement incorporated a current source 26 cooperating with a current-output type DAC to provide a voltage offset. It will readily be appreciated that such potential offset values may also be incorporated with voltage-output type DAC's using known potential level shifter circuits.

What is claimed is:

1. In combination:
   PCM signal input means for providing a PCM signal;
   D.C. control input means for providing a D.C. control signal;
   digital-to-analog converting means having input and output ports;
   a capacitor having a first electrode coupled to the output port of said digital-to-analog converting means, and having a second electrode for providing an output signal;
   a source of reference potential;
   offset potential means selectably operable to establish an offset potential at said first electrode; and
   means including means for concurrently coupling said D.C. control signal to the input port of said digital-to-analog converting means and said reference potential to said second electrode only during predetermined first intervals and for coupling said PCM signal to the input port of said digital-to-analog converting means and conditioning said offset potential means to establish said offset potential at said first electrode during second predetermined intervals.

2. The combination set forth in claim 1 wherein said second predetermined intervals are exclusive of said first predetermined intervals.

3. The combination set forth in claim 1 wherein said offset potential means comprises:
   a current source having a current output terminal; and
   switch means for coupling said current output terminal to said first electrode.

4. The combination set forth in claim 1 wherein said means including means, includes a multiplexer having first and second input ports respectively coupled to said PCM signal input means and said D.C. control input means and having an output port coupled to the input port of said digital-to-analog converting means.

5. The combination set forth in claim 1 wherein said PCM signal is a first video signal, said source of reference potential is a second video signal synchronized with said first video signal and said first predetermined intervals are coincident with blanking intervals of said video signals.

6. In combination:
   PCM signal input means for providing a PCM signal;
   D.C. control input means for providing a D.C. control signal;
   digital-to-analog converting means having input and output ports;
   a capacitor having a first electrode coupled to the output port of said digital-to-analog converting means, and having a second electrode for providing an output signal;
   selectively operable potential offset means for establishing an offset potential at an electrode;
   means including means for concurrently coupling said PCM signal to the input port of said digital-to-analog converting means and conditioning said potential offset means for providing a D.C. offset potential to said first electrode during first intervals and for concurrently disabling said potential offset means and coupling said D.C. control signal to said digital-to-analog converting means during intervening intervals.

* * * * *